United States Patent
Tarquinio

(10) Patent No.: US 7,568,748 B2
(45) Date of Patent: Aug. 4, 2009

(54) CARGO RACK FOR PICKUP TRUCK

(76) Inventor: Peter Tarquinio, 684 Valle Vista, Sierra Madre, CA (US) 91204

( * ) Notice: Subject to any disclaimer, the term of this patent is extended or adjusted under 35 U.S.C. 154(b) by 0 days.

(21) Appl. No.: 12/074,266

(22) Filed: Feb. 29, 2008

(65) Prior Publication Data

US 2008/0211247 A1 Sep. 4, 2008

Related U.S. Application Data

(60) Provisional application No. 60/904,707, filed on Mar. 2, 2007.

(51) Int. Cl.
*B60P 3/00* (2006.01)
(52) U.S. Cl. .......................................................... 296/3
(58) Field of Classification Search ...................... 296/3, 296/26.04, 26.06; 211/195, 175
See application file for complete search history.

(56) References Cited

U.S. PATENT DOCUMENTS

| | | | | |
|---|---|---|---|---|
| 4,770,458 A | * | 9/1988 | Burke et al. ..................... | 296/3 |
| 5,061,000 A | * | 10/1991 | Haugen et al. ................... | 296/3 |
| 5,316,190 A | * | 5/1994 | Bullock ......................... | 224/405 |
| 6,186,571 B1 | * | 2/2001 | Burke ............................ | 296/3 |
| 6,598,922 B2 | * | 7/2003 | Morse et al. ............... | 296/26.02 |
| 6,634,689 B1 | * | 10/2003 | Soto ............................... | 296/3 |
| 6,752,301 B1 | * | 6/2004 | Drolet .......................... | 224/405 |
| 7,128,355 B1 | * | 10/2006 | Anderson et al. ............... | 296/3 |
| 7,258,380 B1 | * | 8/2007 | Aguilar .......................... | 296/3 |
| 7,296,836 B1 | * | 11/2007 | Sabo .............................. | 296/3 |
| 2002/0036412 A1 | * | 3/2002 | Bareket .......................... | 296/3 |
| 2005/0184544 A1 | * | 8/2005 | Iverson et al. ................... | 296/3 |
| 2007/0278810 A1 | * | 12/2007 | Collins .......................... | 296/3 |

* cited by examiner

*Primary Examiner*—H Gutman
(74) *Attorney, Agent, or Firm*—Lynn & Lynn

(57) ABSTRACT

A pickup truck cargo rack is designed for easy mounting to and removal from a truck bed. The cargo rack is adjustable such that cargo support members may be raised to carry large items such as boats, kayaks, lumber, pipe, etc. The cargo support members may also be lowered such that they are spaced only a small distance above the outer side edges of the truck bed enclosure. The lower position of the cargo support members may be used when only small items are to be carried or when it is desired to have the bars essentially out of the field of view of a driver looking at the rearview mirror.

5 Claims, 5 Drawing Sheets

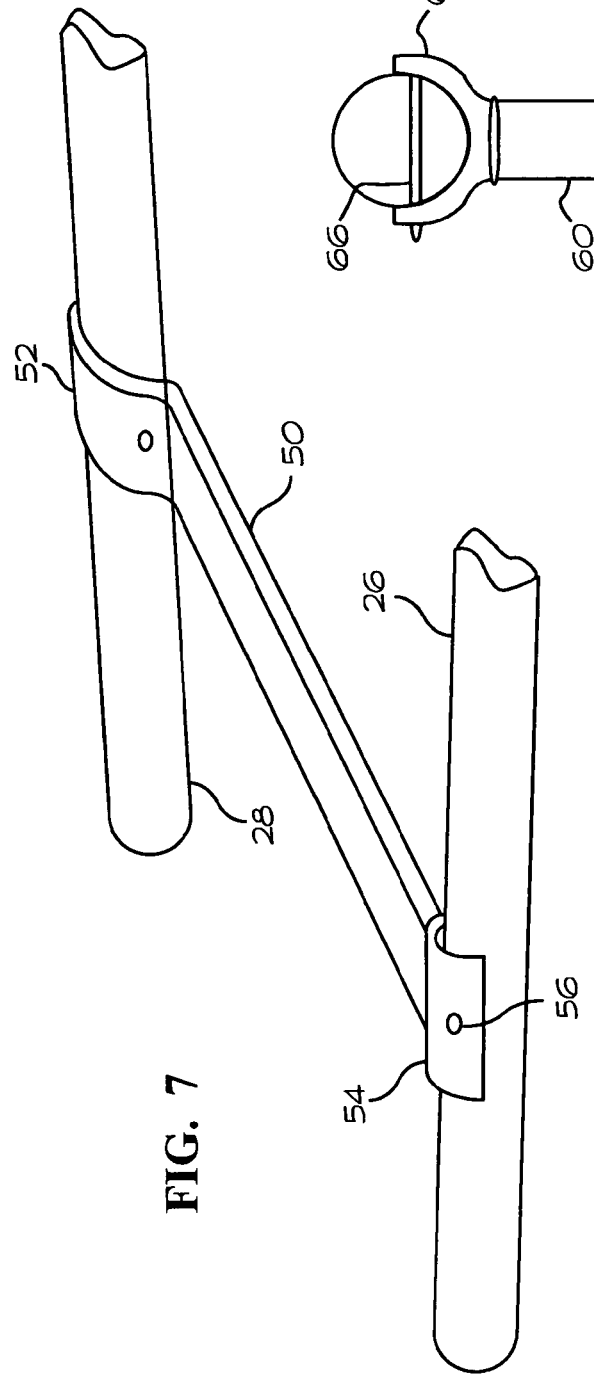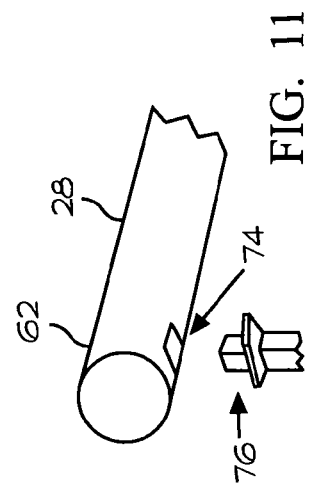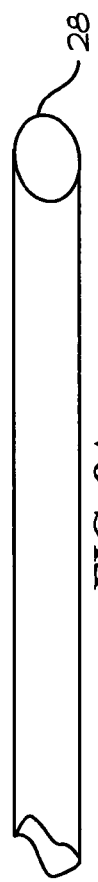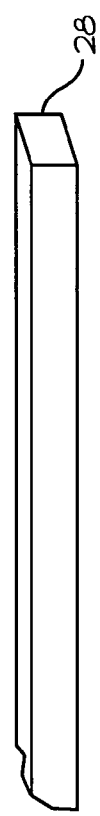

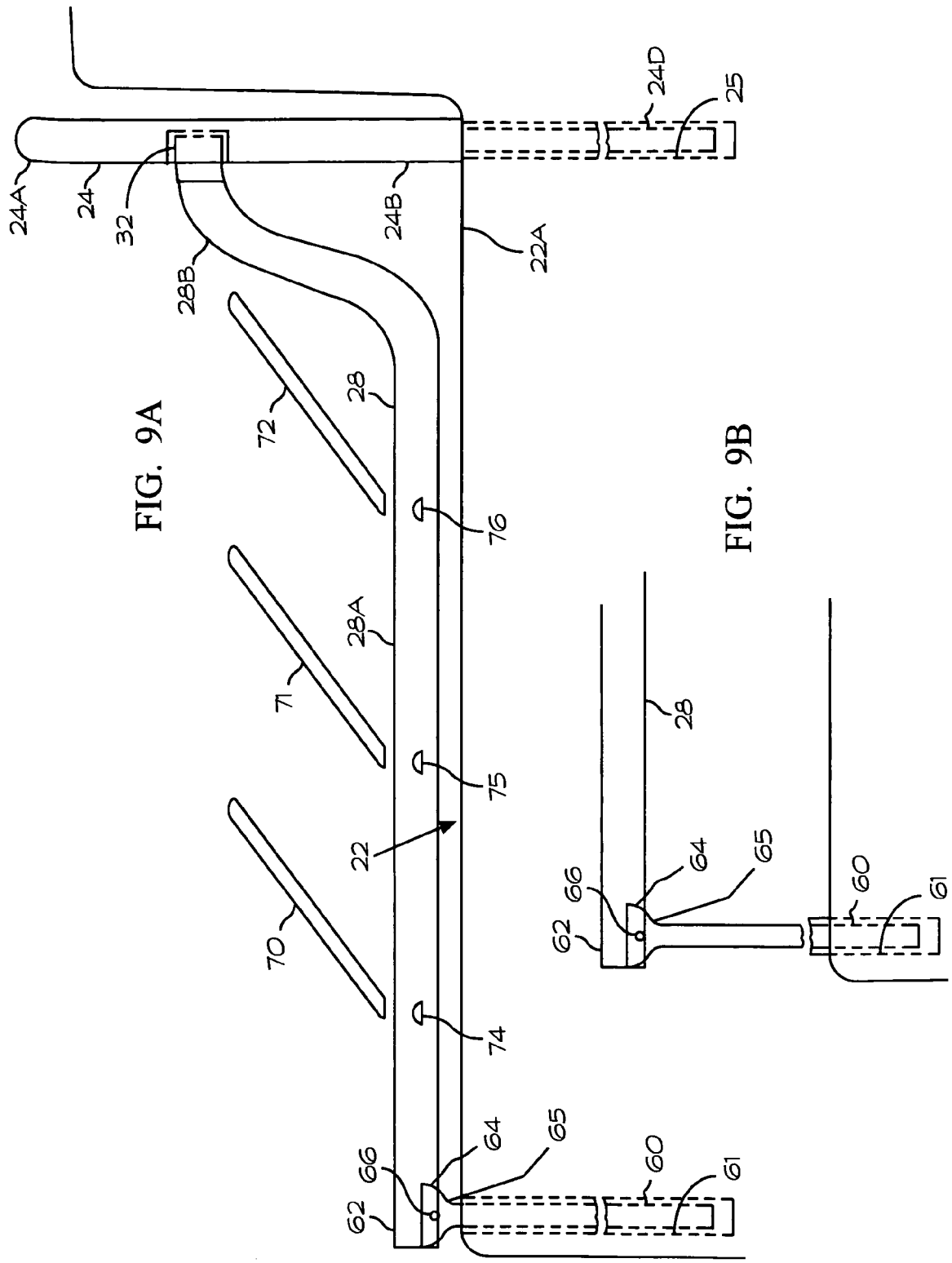

CARGO RACK FOR PICKUP TRUCK

CROSS REFERENCE TO RELATED APPLICATION

Priority is claimed under U.S. Provisional Application 60/904,707, filed Mar. 2, 2007.

This invention relates generally to cargo racks for motor vehicles and particularly to a cargo rack suitable for use with a pickup truck.

The prior art is replete with various types of cargo racks for pickup trucks. Such racks may be permanently attached or may be removable.

SUMMARY OF THE INVENTION

The present invention provides a pickup truck cargo rack that may be easily mounted to a truck bed and that may be easily removed. The cargo rack according to the present invention has the additional feature of being adjusted such that cargo support members may be raised to carry large items such as boats, kayaks, lumber, pipe, etc. The cargo support members may also be lowered such that they are spaced only a small distance above the outer side edges of the truck bed enclosure. The lower position of the cargo support members may be used when only small items are to be carried or when it is desired to have the bars essentially out of the field of view of a driver looking at the rearview mirror.

Accordingly, a cargo rack according to the present invention comprises a frame having a generally horizontal bar portion and a pair of frame support members extending generally downward away from the horizontal bar portion for mounting the frame to the pickup truck. The cargo rack further includes a first cargo support member having a first end pivotally mounted to the frame. The first cargo support member includes a generally horizontal cargo support bar and an intermediate section that extends generally vertically away from the cargo support bar and further includes a second end that extends essentially to the rear end of the pickup truck bed. The cargo rack also includes a second cargo support member having a first end pivotally mounted to the frame. The second cargo support member includes a generally horizontal cargo support bar and an intermediate section that extends generally vertically away from the cargo support bar and further includes a second end that extends essentially to the rear end of the pickup truck bed. The first and second cargo support members are pivotal relative to the frame between a raised position where the first and second intermediate sections extend upward from the pickup truck bed to hold the first and second cargo support bars spaced a first selected distance above the pickup truck bed and lower position where the first and second intermediate sections extend downward toward the pickup truck bed to hold the first and second cargo support bars spaced near pickup truck bed.

The structure and advantages of the present invention may be understood and appreciated by referring to the accompanying drawings, which are not drawn to any scale, and to the following detailed description of the invention.

BRIEF DESCRIPTION OF THE DRAWINGS

FIG. 7 is a perspective view showing an optional structure for mounting the stabilizer arms to the support members;

FIGS. 8A-8C illustrate various structures for the stabilizer arms;

FIG. 9A is a partially exploded perspective view showing a cargo support member connected to the base, three stabilizer arms and a support strut arranged to support an end of the support member;

FIG. 9B is a shows the support strut of FIG. 9A in a raised position;

FIG. 10 is a rear elevation view showing the cargo support member of FIG. 10 mounted to the support strut; and FIG. 11 shows a structure for mounting the cargo support member of FIGS. 9A and 9B to the support strut.

DETAILED DESCRIPTION OF THE INVENTION

Figure 1:
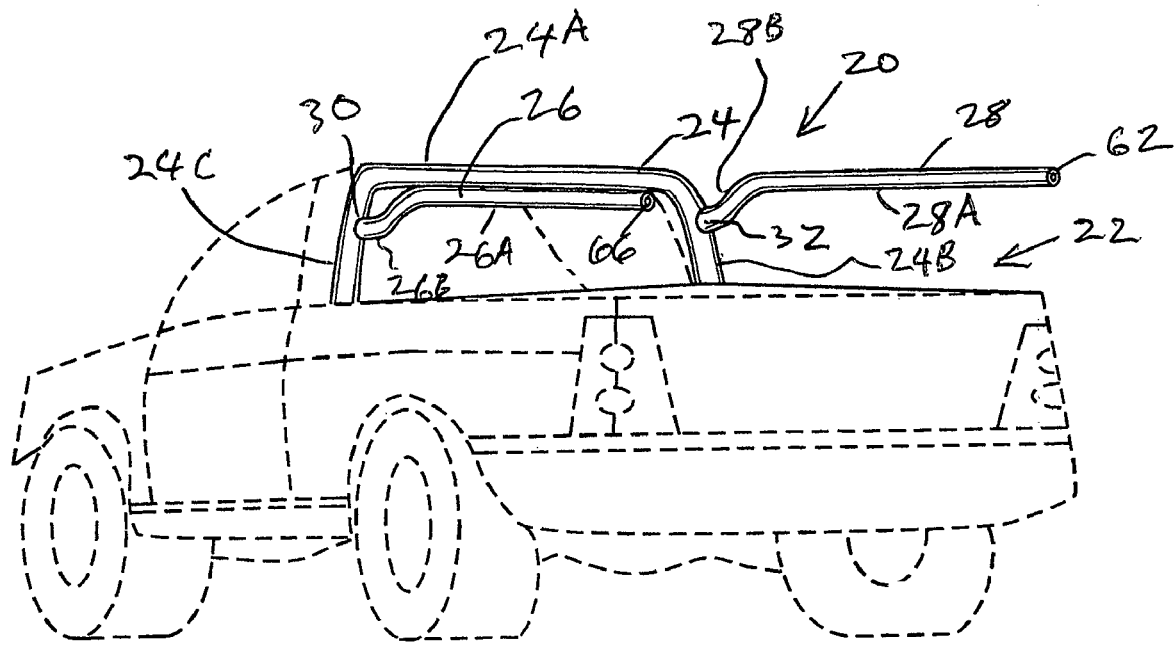
FIG. 1 is a perspective view showing a cargo rack according to the present invention mounted to a pickup truck and arranged in an upper position.

Referring to FIG. 1, a cargo rack 20 according to the present invention is shown mounted on a pickup truck 22. The cargo rack 20 includes a frame 24 and a pair of cargo support members 26 and 28 having ends 30 and 32, respectively that are pivotally mounted to the frame 24. The cargo support members 26 and 28 may be mounted in recesses 18 and 19, respectively, that are formed in the frame 24. The frame 24 includes a bar 24A that is horizontal when the frame 24 is mounted to the pickup truck. The frame also has a pair of downwardly extending frame support members 24B and 24C. As shown in FIG. 9A a frame support strut 24D extends from the frame support member 24B into a hole 25 in the pickup bed frame 22A. The frame support member 24C includes a similar frame support strut (not shown).

Figure 2:
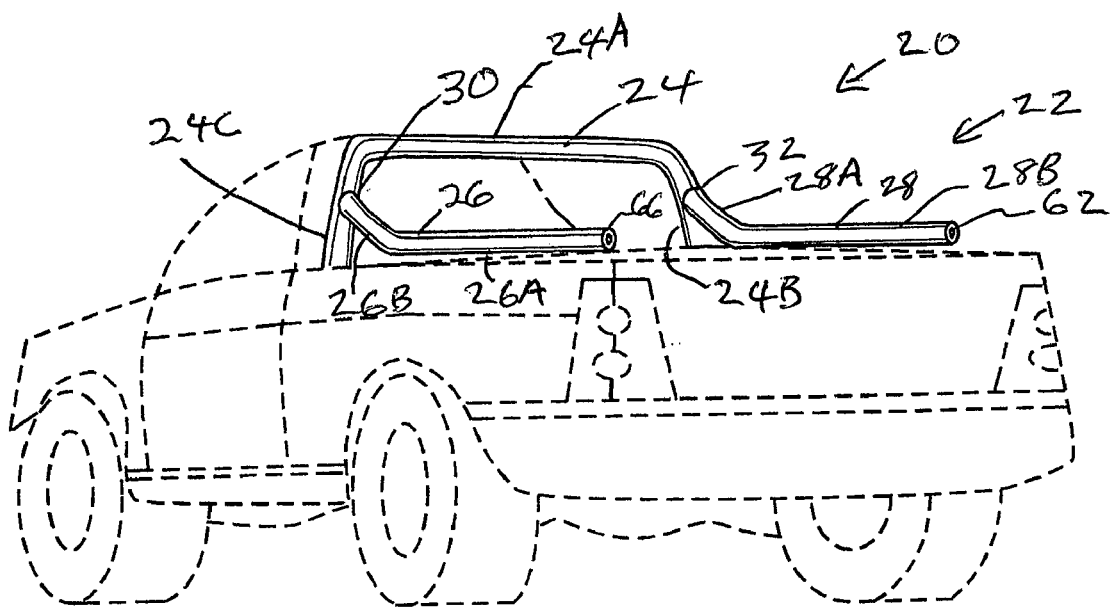
FIG. 2 is a perspective view showing the cargo rack of FIG. 1 arranged in a lower position.
Figure 3:
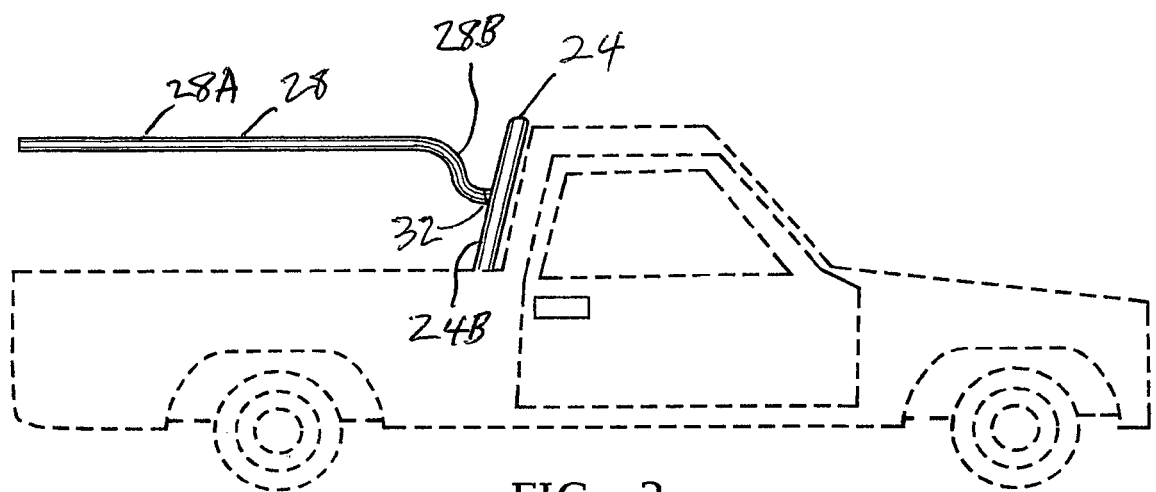
FIG. 3 is a side elevation view showing the cargo rack in its upper position on a pickup truck.
Figure 4:
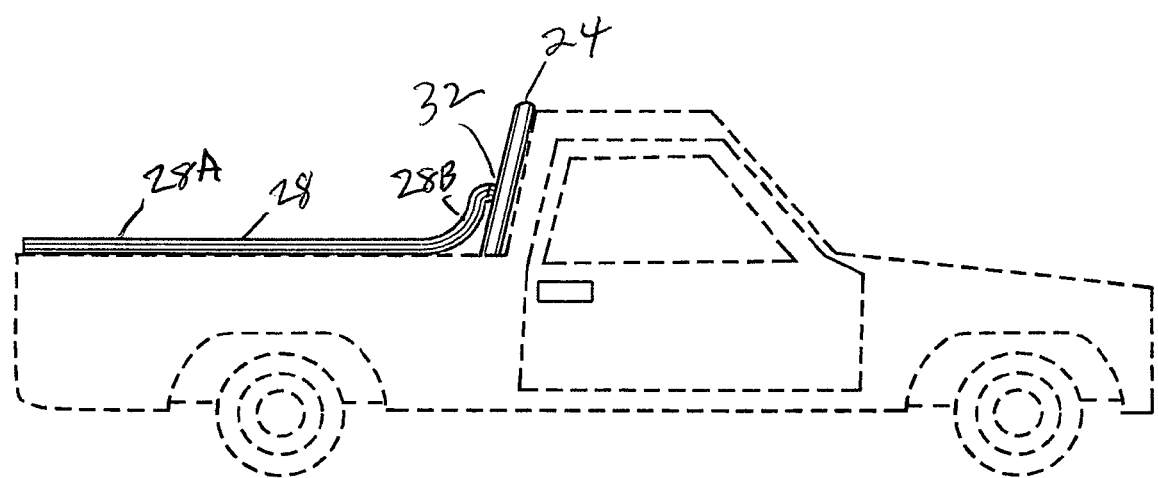
FIG. 4 is a side elevation view showing the cargo rack in its lower position on a pickup truck.

Referring to FIGS. 1-6 and 9, the ends 30 and 32 of the cargo support members 26 and 28, respectively, are pivotally connected to the frame 24. The cargo support member 28 includes a generally horizontal cargo support bar 28A and an intermediate section 28B that extends upwardly away from the cargo support bar 28A to the end 32. The cargo support member 28 may be rotated about the pivotal connection of the end 32 to the frame support member 24B so that the cargo support member 28 may be moved between an upper position as shown in FIG. 1 to a lower position as shown in FIG. 2. The cargo support member 26 similarly has horizontal cargo support bar 26A and an intermediate section 26B. As shown in FIGS. 1 and 2, the cargo support member 26 may also be moved between the upper and lower positions by rotating it about the pivotal connection of the end 30 to the frame support member 24C. The cargo support members 26 and 28 are generally placed in the lower position when no cargo or only a small item is being carried. The cargo support members 26 and 28 are generally placed in the upper position when a large item is being carried.

Figure 5:
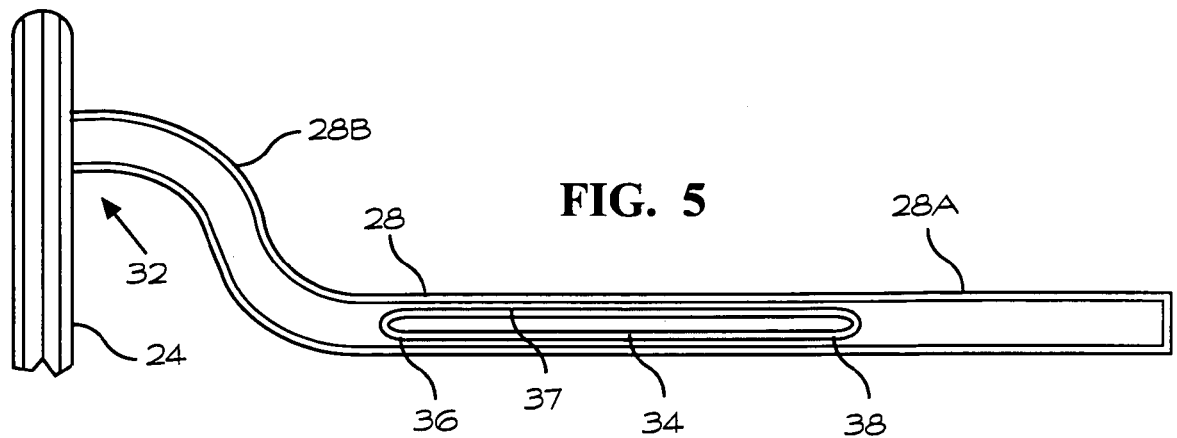
FIG. 5 is a side elevation view of the invention showing a frame, a cargo support member extending from the base and a swing out stabilizer arm connected to the support member.

Referring to FIG. 5, the cargo support member 28 preferably includes a stabilizer arm 34. The stabilizer arm 34 has an end 36 that is pivotally connected to the cargo support member 28. The stabilizer arm 34 fits within a slot 37 in the cargo support member 28 for convenient storage or shipping. The stabilizer arm 34 may be rotated out of the slot 37 so that the other end 38 of the stabilizer arm may be connected to the cargo support member 26 as shown in FIG. 6.

Figure 6:
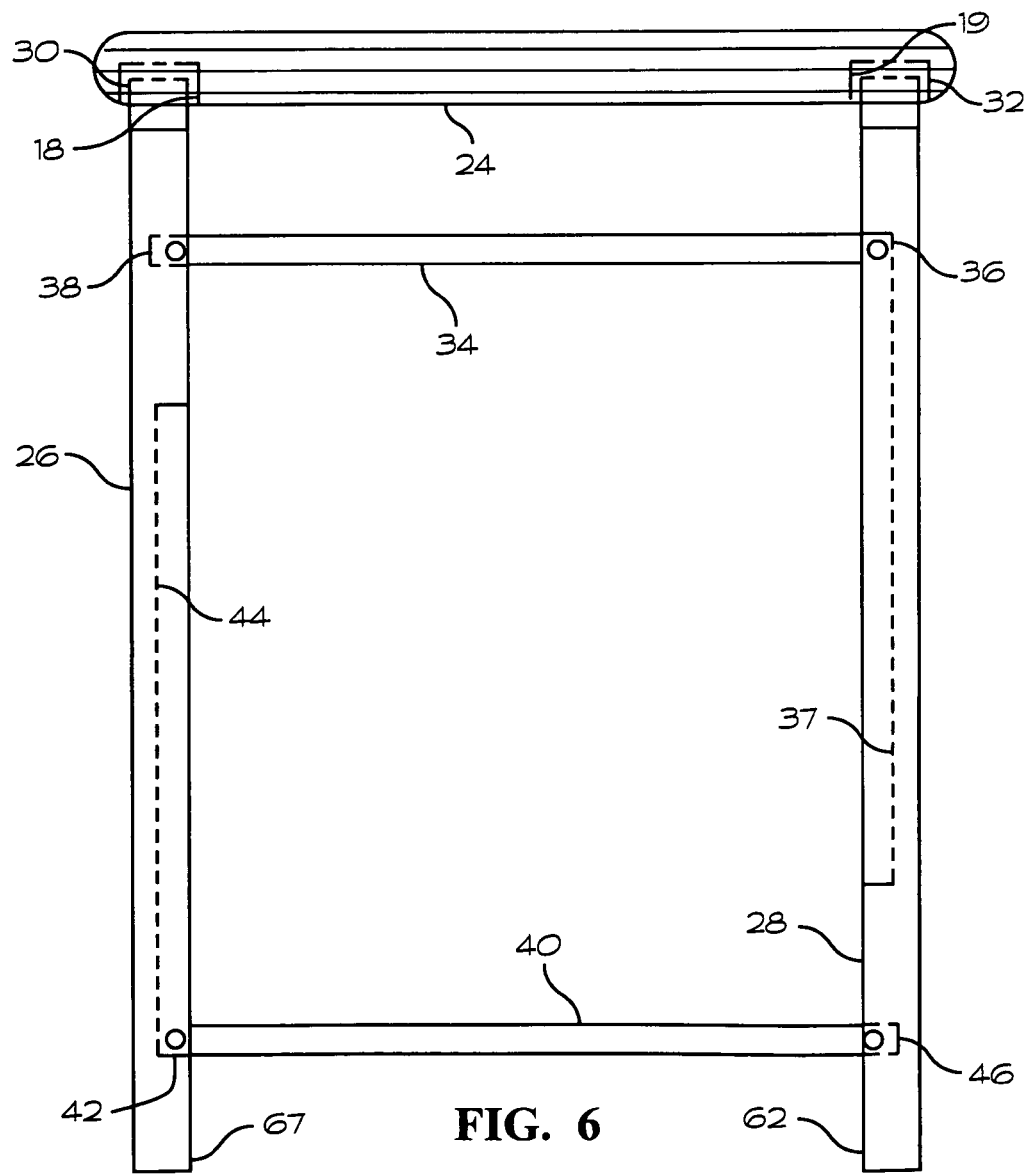
FIG. 6 is a top plan view of the cargo rack according to the present invention showing a pair of cargo support members extending from the base and a pair of swing out stabilizer arms extending between the support members.

Referring to FIG. 6, the cargo support member 26 preferably includes a stabilizer arm 40. The stabilizer arm 40 has an end 42 that is pivotally connected to the cargo support member 26. The stabilizer arm 40 fits within a slot 44 in the cargo support member 26 for convenient storage or shipping. The stabilizer arm 40 may be rotated out of the slot 44 so that the other end 46 of the stabilizer arm 40 may be connected to the cargo support member 28. The stabilizer arms 34 and 40 cooperate with the cargo support members 26 and 28 to provide a rigid structure for carrying items such as surfboards, small boats, lumber etc.

FIG. 7 shows an alternative stabilizer arm structure. A stabilizer arm 50 includes curved ends 52 and 54 that conform to the shape of the cargo support members 26 and 28. The curved ends 52 and 54 preferably include holes 56 for receiving bolts or pins for connecting the stabilizer arm 50 to the cargo support arms 26 and 28.

FIGS. 8A-8C show various structures that may be used to form the stabilizer arms 26 and 28. As shown in FIG. 8A, the stabilizer arms 26 and 28 may have oval, circular, rectangular or square cross sections.

FIGS. 9A and 9B show a support strut 60 mounted to the pickup truck and connected to the rear end 62 of the cargo support member 28. The support strut 60 provides additional stability by restraining the rear end 62 against vertical and horizontal movement. The support strut 60 preferably includes an elongate support rod 61 and a cradle 64 extending from an end 65 of the rod 61 as shown in FIGS. 9A, 9B and 10 for connecting the support strut 60 to the cargo support member 28. A pin 66 is arranged to extend through holes in the cradle 64 and in the cargo support member 28 to provide a secure connection between the support strut 60 and the cargo support member 28. A support strut (not shown) similar to the support strut 60 may be connected to the rear end 67 of the cargo support member 26.

FIG. 9A also shows stabilizer arms 70-72 that may be mounted in corresponding passages 74-76 in the cargo support arm 28.

FIG. 11 shows an alternate means for connecting the support strut 60 to the cargo support member 28. The cargo support member 28 has a hole 74 arranged to receive the upper end 76 of the support structure.

The support struts 60 are arranged so that the rear ends 62 of the cargo support members 26 and 28 are supported in both the upper and lower positions. As shown in FIG. 9, the support rod 61 has a length sufficient to extend out of a hole that typically is included in the rear side portion of the rim of the truck bed when the cargo support member 28 is in the raised position of FIG. 1.

The described embodiments of the invention are exemplary only. Modifications may be made without departing from the scope of the invention as defined by the appended claims. For example, there are a number of ways for connecting the various components of the invention together.

What is claimed is:

1. A cargo rack for a vehicle such as a conventional pickup truck having a conventional pickup bed, comprising:
   a frame having a generally horizontal bar portion and a pair of frame support members extending generally downward away from the horizontal bar portion for mounting the frame to the pickup truck;
   a first cargo support member having a first end pivotally mounted to the frame, the first cargo support member including a generally horizontal cargo support bar and a curved intermediate section that extends generally vertically away from the cargo support bar and further including a second end that extends essentially to the rear end of the pickup truck bed;
   a second cargo support member having a first end pivotally mounted to the frame, the second cargo support member including a generally horizontal cargo support bar and a curved intermediate section that extends generally vertically away from the cargo support bar and further including a second end that extends essentially to the rear end of the pickup truck bed;
   a first support strut connected to the first cargo support bar near the second end thereof for mounting the second end of the first cargo support bar to the pickup truck;
   a second support strut connected to the second cargo support bar near the second end thereof for mounting the second end of the second cargo support bar to the pickup truck; and
   wherein the first and second cargo support members are pivotal relative to the frame between a raised position where the first and second intermediate sections extend upward from the pickup truck bed to hold the first and second cargo support bars spaced a first selected distance above the pickup truck bed and lower position where the first and second intermediate sections extend downward toward the pickup truck bed to hold the first and second.

2. The cargo support rack of claim 1, further comprising a stabilizer arm formed as an enlogate bar connected between the first and second cargo support bars.

3. The cargo support rack of claim 2 wherein the stabilizer arm has a first end that is pivotally mounted to the first cargo support bar, the stabilizer arm being rotatable between a stored position where it is essentially parallel to the first cargo support bar and a deployed position wherein the stabilizer arm has a second end that is connected to the second cargo support bar.

4. The cargo support rack of claim 3 wherein the first cargo support bar has an elongate recess therein where the stabilizer arm may be placed when the stabilizer arm is in the stored position.

5. The cargo support rack of claim 1, further comprising a plurality of stabilizer arms formed as elongate bars connected between the first and second cargo support bars.

* * * * *